(12) United States Patent
Chamariq et al.

(10) Patent No.: US 6,457,582 B1
(45) Date of Patent: Oct. 1, 2002

(54) STORAGE UNIT FOR COMPACT DISCS

(76) Inventors: Mouna Chamariq, 902 Burdette Dr., Downingtown, PA (US) 19335-4134; Jamal Chamariq, 902 Burdette Dr., Downingtown, PA (US) 19335-4134

( * ) Notice: Subject to any disclaimer, the term of this patent is extended or adjusted under 35 U.S.C. 154(b) by 0 days.

(21) Appl. No.: 09/825,026

(22) Filed: Apr. 2, 2001

Related U.S. Application Data

(63) Continuation-in-part of application No. 09/428,858, filed on Oct. 28, 1999.

(51) Int. Cl.[7] .............................................. B65D 73/00
(52) U.S. Cl. ................ 206/308.1; 211/41.12
(58) Field of Search ............................ 206/308.1, 309, 206/311, 312; 211/40, 41.12

(56) References Cited

U.S. PATENT DOCUMENTS

| | | |
|---|---|---|
| 2,598,492 A | 5/1952 | Boes |
| 3,897,871 A | 8/1975 | Zinnbauer |
| D249,035 S | 8/1978 | Martin |
| 4,629,067 A | 12/1986 | Pavlik et al. |
| 5,027,955 A | 7/1991 | Shoemaker, Jr. et al. |
| 5,027,960 A | 7/1991 | Rainville |
| 5,170,893 A | 12/1992 | Smith |
| 5,188,240 A | 2/1993 | Marino et al. |
| 5,215,198 A | 6/1993 | Sutton |
| 5,259,497 A | 11/1993 | Brothers et al. |
| 5,314,077 A | 5/1994 | Theosabrata |
| 5,333,741 A | 8/1994 | Yang |
| 5,393,135 A | 2/1995 | Tisbo et al. |
| 5,515,968 A | 5/1996 | Taniyama |
| 5,515,979 A * | 5/1996 | Salvail .................. 211/40 |
| 5,595,308 A | 1/1997 | King et al. |
| D392,498 S * | 3/1998 | Steinbeck ............... D6/629 |
| 5,921,404 A | 7/1999 | Cooke et al. |
| 6,039,190 A | 3/2000 | Clausen |

* cited by examiner

*Primary Examiner*—Shian Luong

(57) ABSTRACT

A compact disc storage system is provided including a plurality of compact disc housings each including a bottom portion and a top portion pivotally coupled thereto. A multiple compact disc housing storage unit includes an elongated strip. A front face of the strip has a plurality of slots adapted for receiving an inboard edge of the bottom portion of the compact disc housing so as to allow the top portion of the compact disc housing to pivot with respect to the bottom portion for allowing access to a compact disc located inside the compact disc housing Each slot is defined by a pair of slot-defining members integrally coupled to the front face of the strip in a spaced parallel relationship and extending perpendicularly with respect to the strip.

8 Claims, 6 Drawing Sheets

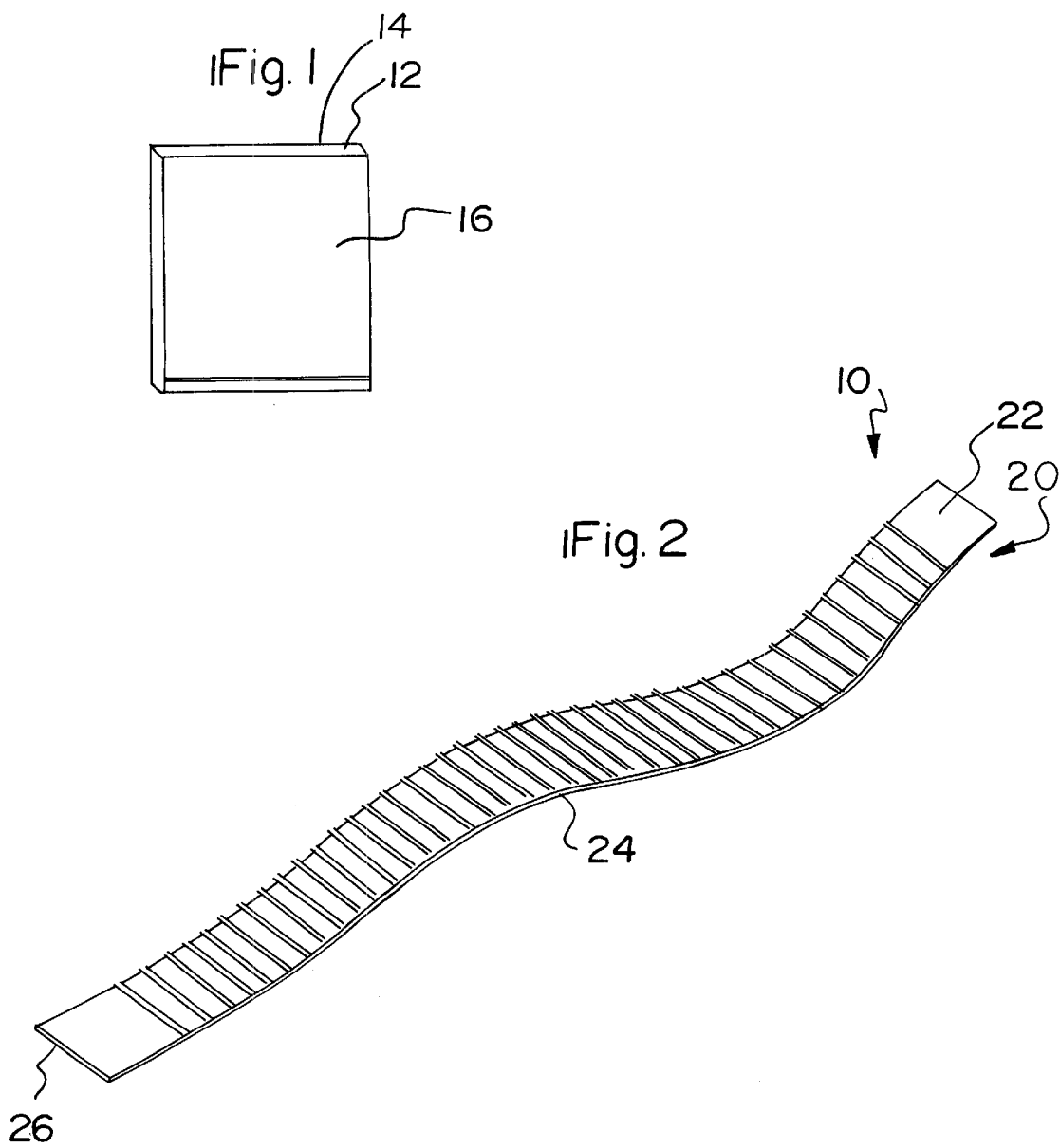

STORAGE UNIT FOR COMPACT DISCS

REFERENCE TO RELATED APPLICATION

This application is a-continuation-in-part of our United States utility application filed on Oct. 28, 1999 and assigned application Ser. No. 09/428,858.

BACKGROUND OF THE INVENTION

1. Field of the Invention

The present invention relates to compact disc storage systems and more particularly pertains to a new storage unit for compact discs for storing compact disc housings such that they may be opened for access to the compact disc while the housing remains mounted on the storage unit along with other compact disc housings mounted on the storage unit.

2. Description of the Prior Art

The use of compact disc storage systems is known in the prior art. More specifically, compact disc storage systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art compact disc storage systems include U.S. Pat. No. 5,027,955; U.S. Pat. No. 5,393,135; U.S. Pat. No. 5,170,893; U.S. Pat. No. 5,027,960; U.S. Pat. No. 5,027,960; and U.S. Pat. Des. No. 249,035.

In these respects, the storage unit for compact discs according to the present invention substantially departs from the conventional concepts and designs of the prior art, and in so doing provides an apparatus primarily developed for the purpose of storing compact disc housings such that they may be opened for access to the compact disc while the housing remains mounted on the storage unit along with other compact disc housings mounted on the storage unit.

SUMMARY OF THE INVENTION

In view of the foregoing disadvantages inherent in the known types of compact disc storage systems now present in the prior art, the present invention provides a new storage unit for compact discs construction wherein the same can be utilized for storing compact disc housings such that they may be opened for access to the compact disc while the housing remains mounted on the storage unit along with other compact disc housings mounted on the storage unit.

The general purpose of the present invention, which will be described subsequently in greater detail, is to provide a new storage unit for compact discs apparatus and method which has many of the advantages of the compact disc storage systems mentioned heretofore and many novel features that result in a new storage unit for compact discs which is not anticipated, rendered obvious, suggested, or even implied by any of the prior art compact disc storage systems, either alone or in any combination thereof.

To attain this, the present invention generally comprises a multiple compact disc housing storage unit including an elongated strip having a rectangular configuration. The storage unit has a front surface, a rear surface, and a periphery formed therebetween. The periphery is defined by a pair of long linear parallel side edges and a pair of short linear parallel end edges that preferably have a trapezoidal cross section. The front face has a plurality of slots each defined by a pair of thin planar rectangular members integrally coupled to the front face of the strip in a spaced parallel relationship. The slot-defining members extend between the long linear parallel side edges.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new storage unit for compact discs apparatus and method which has many of the advantages of the compact disc storage systems mentioned heretofore and many novel features that result in a new storage unit for compact discs which is not anticipated, rendered obvious, suggested, or even implied by any of the prior art compact disc storage systems, either alone or in any combination thereof.

It is another object of the present invention to provide a new storage unit for compact discs that may be easily and efficiently manufactured and marketed.

It is a further object of the present invention to provide a new storage unit that is of a durable and reliable construction.

An even further object of the present invention is to provide a new storage unit for compact discs which is susceptible of a low cost of manufacture with regard to both materials and labor, and which accordingly is then susceptible of low prices of sale to the consuming public, thereby making such storage unit for compact discs economically available to the buying public.

Still yet another object of the present invention is to provide a new storage unit for compact discs which provides in the apparatuses and methods of the prior art some of the advantages thereof, while simultaneously overcoming some of the disadvantages normally associated therewith.

Still another object of the present invention is to provide a new storage unit for compact discs for storing compact disc housings such that they may be opened for access to the compact disc while the housing remains mounted on the storage unit along with other compact disc housings mounted on the storage unit.

Even still another object of the present invention is to provide a new storage unit for compact discs that includes a plurality of compact disc housings each including a bottom portion and a top portion pivotally coupled thereto. A multiple compact disc housing storage unit includes an elongated strip. A front face of the strip has a plurality of slots each defined by a pair of thin planar members integrally coupled to the front face of the strip in a spaced parallel relationship.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic illustration of a compact disc housing, or jewel case, suitable for use with the present invention.

FIG. 2 is a schematic perspective view of the storage unit of the present invention.

DESCRIPTION OF THE PREFERRED EMBODIMENT

Figure 3:
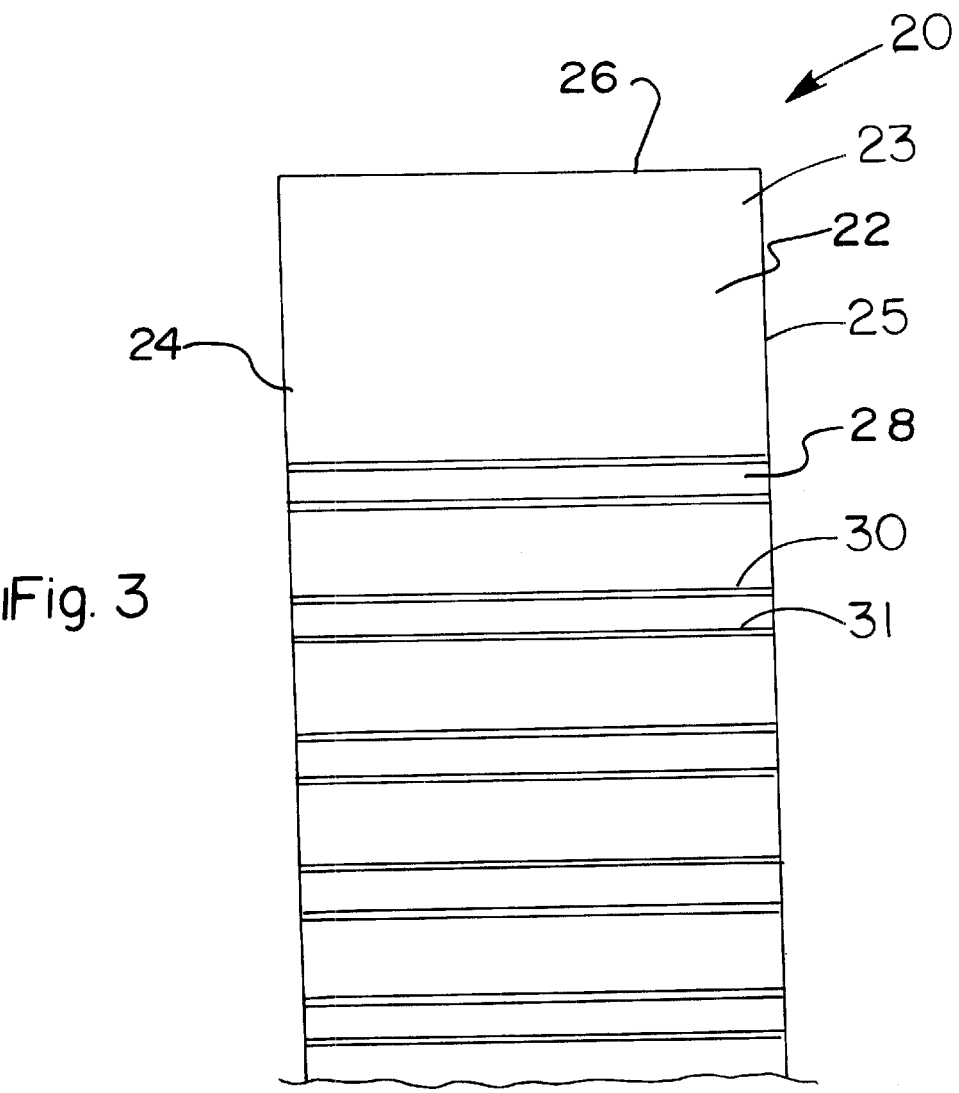
FIG. 3 is a schematic front view of the storage unit of the present invention.
Figure 4:
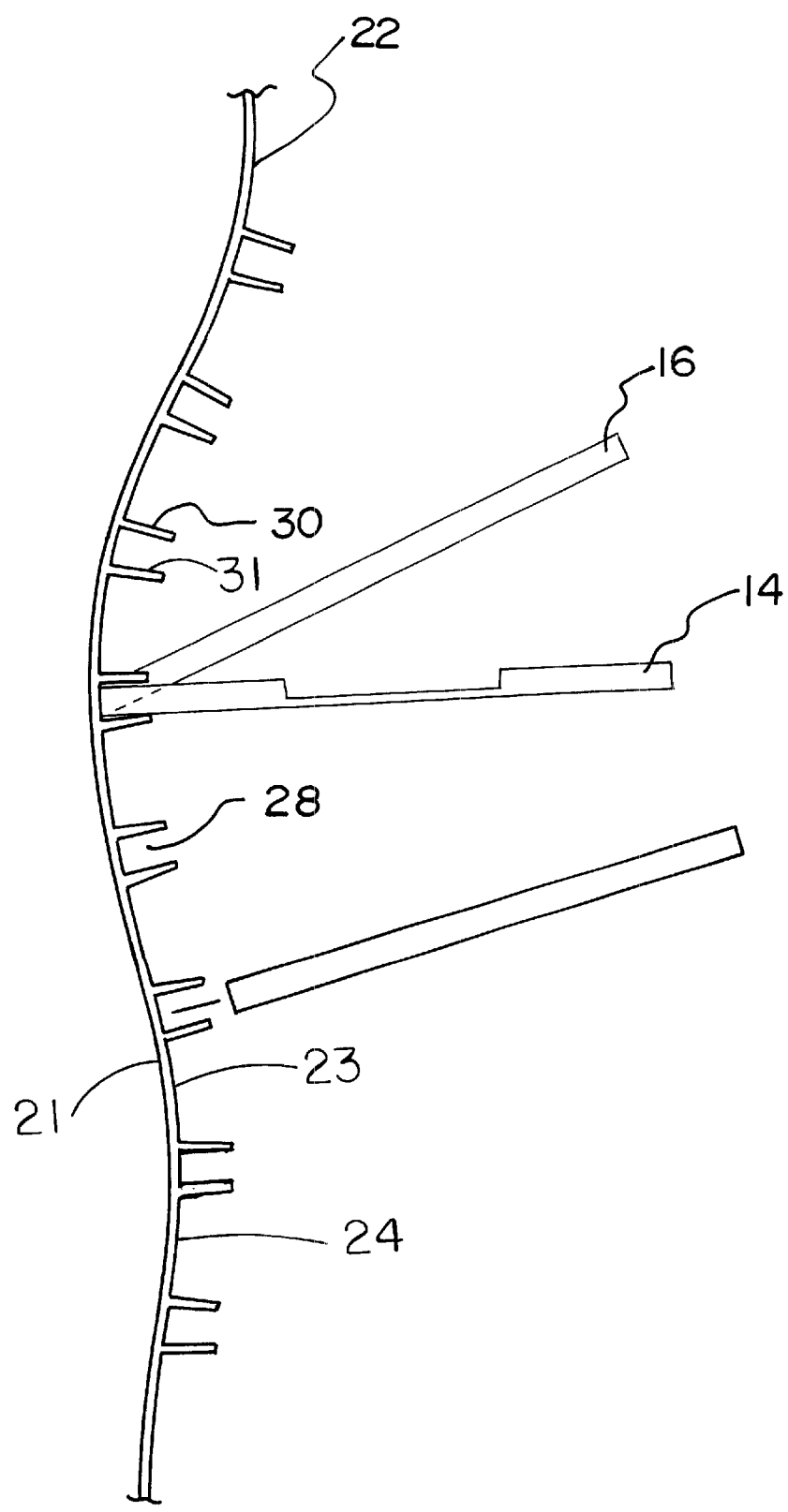
FIG. 4 is a schematic side view of the storage unit of the present invention in relation to a pair of compact disc jewel cases.

With reference now to the drawings, and in particular to FIGS. 1 through 10 thereof, a new storage unit for compact discs embodying the principles and concepts of the present invention will be described.

The compact disc storage unit of the present invention is highly suitable for use with compact disc storage housings, commonly referred to as compact disc jewel cases, which have a substantially standard size and shape from one case source to another case source. Each compact disc jewel case 12 includes a bottom portion 14 and a top, or cover, portion 16 that is pivotally mounted on the bottom portion.

The bottom portion 14 of the jewel case has an inboard edge 32, an outboard edge 33, and a pair of side edges 34, 35 extending between the inboard and outboard edges. The top portion is mounted on the bottom portion at a location adjacent to the inboard edge of the bottom portion. The inboard edge 32 of the bottom portion of the jewel case has a standard width of approximately 1 cm. The bottom portion of the jewel case has a hinge portion 17 located adjacent to the inboard edge. The hinge portion has a standard width extending inwardly from the inboard edge approximately 1.2 cm, and the hinge portion 17 has a standard length of approximately 12 cm between the side edges of the bottom portion. The hinge portion has a standard thickness of approximately 1 cm, which corresponds to the width of the inboard edge of the bottom portion.

The top portion 16 of the jewel case has an inboard edge 36, an outboard edge 37, and a pair of side edges 38, 39 extending between the inboard and outboard edges. The top portion has a pair of arms 18, 19 extending outwardly from the inboard edge of the top portion in a substantially parallel relationship to form a gap therebetween. The standard distance between the arms, and thus the standard size of the gap, is approximately 12 cm. The arms 18, 19 are oriented substantially parallel to the side edges, and are in a substantially coplanar relationship with the side edges. The side edges of the bottom portion at the hinge portion of the bottom portion are positioned between the arms. Each of the arms is rotatably mounted on one side edge of the side edges of the bottom portion adjacent to the inboard edge thereof, with each of the arms being positioned at an end of the hinge portion.

The multiple compact disc housing storage unit 20 includes an elongated strip 22 that may have a substantially rectangular configuration. The storage unit has a front surface 23, a rear surface 21, and a periphery formed therebetween. The periphery is defined by a pair of long linear parallel side edges 24, 25 and a pair of short linear parallel end edges 26. The end edges may have a trapezoidal cross-section for forming a coupling structure.

The front surface 23 of the elongated strip has a plurality of slots 28. Each slot is defined by a pair of thin planar substantially rectangular members 30, 31 that are integrally coupled to and extend outwardly from the front surface of the strip in a spaced and substantially trapezoidal relationship in which the inner faces of the slot-defining members converge slightly towards the free ends of the slot-defining members to permit relatively tight holding of the jewel case at the level of the hinge portion 17 of the bottom portion 14 of the jewel case. Optionally, the inner faces of the slot-defining members may be in a spaced and substantially parallel relationship which may reduce the holding capability of the slot-defining members somewhat. The slot defining members extend between the long linear parallel side edges 24, 25. The slot-defining members may extend substantially perpendicular to the front surface 23 of the strip 22.

In one embodiment of the invention, each pair of slot-defining members 30, 31 is spaced from an adjacent pair of slot-defining members by a distance that permits the top portion of a jewel case held between one pair of slot-defining members to be pivoted from the bottom portion a sufficient amount to permit removal of the disc from the jewel case without having to remove the jewel case from engagement with the slot-defining members. Illustratively, the spacing between adjacent pairs of slot-defining members is greater than twice the spacing between the slot defining members of each pair. It is important-that the width of the slot defining members between the side edges is less than (or at most substantially the same as) the maximum width of the inboard edge of the bottom portion of the compact disc housings, which is standardized at approximately 12 cm. This width limitation on the slot, and the slot-defining members 30, 31, permits the slot-defining members to embrace and grip the hinge portion of the bottom portion of the jewel case without obstructing or otherwise hindering the pivoting of the arms of the top portion which would prevent the opening and closing of the top portion with respect to the bottom portion while the jewel case is mounted on the strip. Further, it is highly preferable that the storage unit be constructed from a material that has some rigidity and but permits some resilient flexibility such that the slot-defining members 30, 31 are not spreadable apart from each other without some degree of resistance from the slot-defining members to thereby permit the hinge portion of the jewel case to be lodged between the members in a manner that provides some resistance to removal of the jewel case from between the slot-defining members once inserted therebetween. Optionally, the storage unit may be constructed from materials of various colors.

During use, the inboard edge of the bottom portion of each compact disc housing may be removably inserted into one of the slots between the members 30, 31 such that the compact disc housing is supported in a substantially perpendicular relationship with the plane of the strip of the storage unit. Situated as such, the top portion of each compact disc housing is permitted to be pivoted upwardly to thereby allow access to the compact disc held on the bottom portion between the top and bottom portions of the compact disc jewel case. It should be noted that the limited flexibility of the storage unit 20 permits the storage unit to be configured in either a linear or arcuate orientation.

Figure 5:
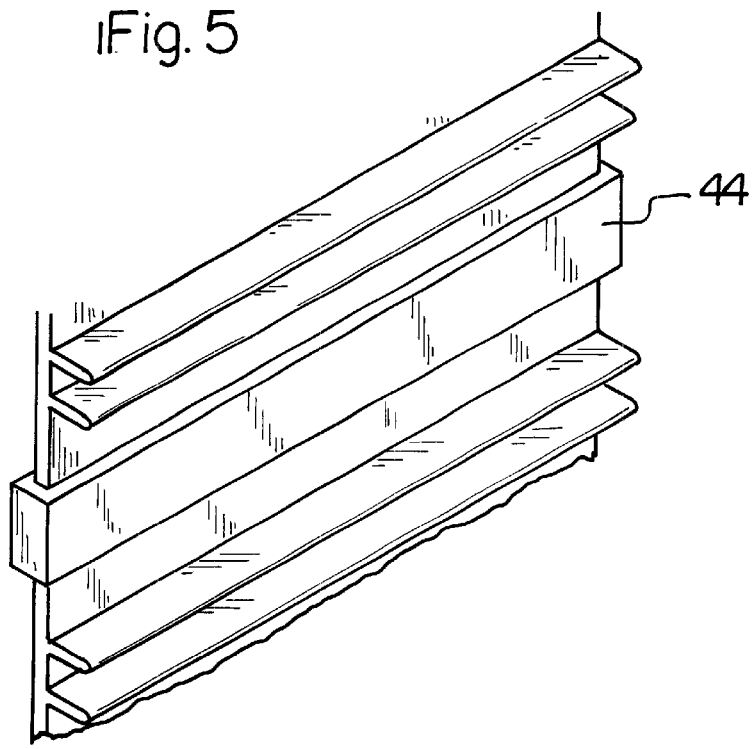
FIG. 5 is a schematic perspective view of an optional coupling structure for connecting a pair of storage units of the present invention.
Figure 6:
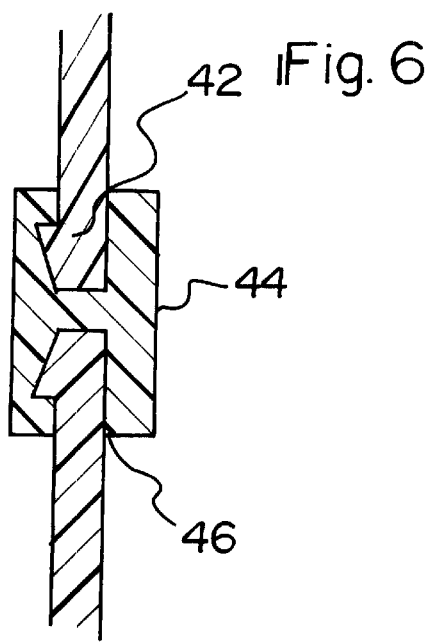
FIG. 6 is a schematic cross-sectional view of the coupling structure of FIG. 5.
Figure 7:
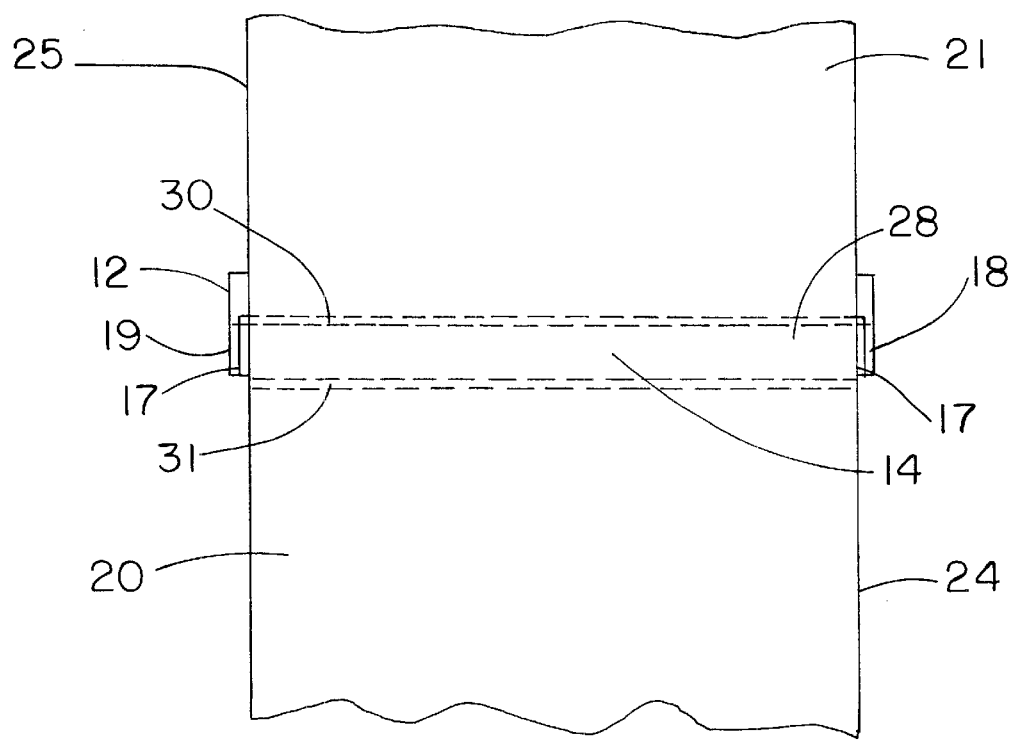
FIG. 7 is a schematic rear view of the storage unit of the present invention with a compact disc jewel case mounted thereon.
Figure 8:
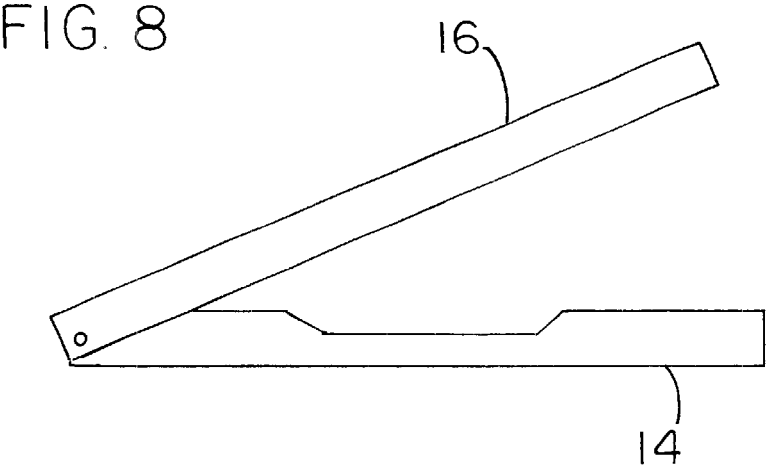
FIG. 8 is a schematic side view of a compact disc jewel case.
Figure 9:
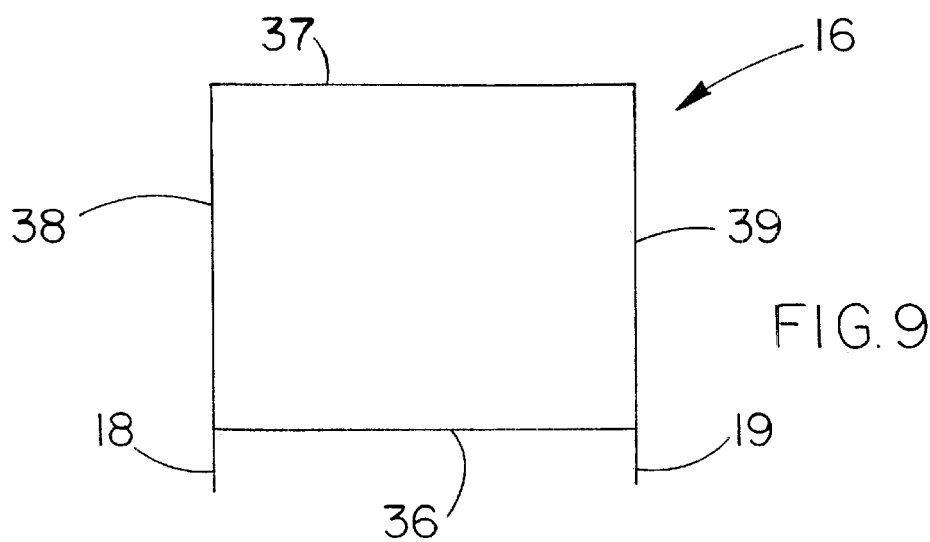
FIG. 9 is a schematic top view of the top portion of a compact disc jewel case.
Figure 10:
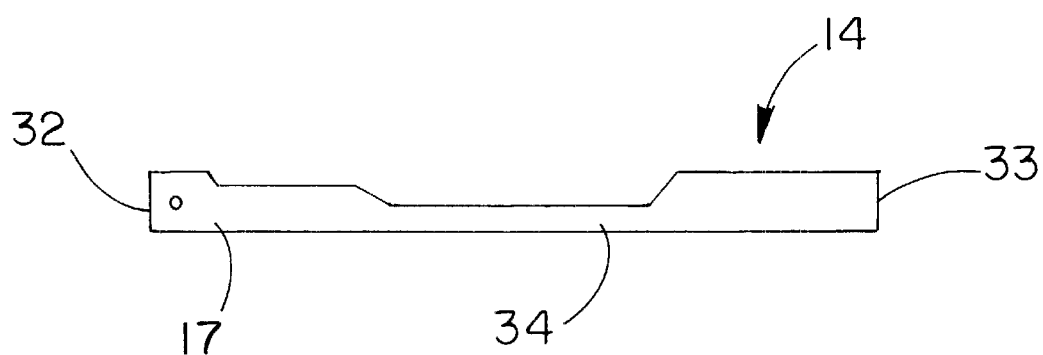
FIG. 10 is a schematic side view of the bottom portion of a compact disc jewel case.

As an option, a plurality of the strips may be provided each with an outwardly extending lip 42 formed along a top and bottom edge thereof, as shown in FIGS. 5 and 6. Such lip preferably has a triangular cross-section. Associated therewith is an elongated coupling member 44 with a top and bottom face each with a slot 46 formed therein for releasably receiving the lips of strips such that the strips reside in linear alignment. The thickness of the strip is approximately 4 mm. The thickness of each of the slot-defining members is slightly greater than 1 mm.

One highly preferred embodiment of the invention has a width between the side edges of approximately 12 cm. The length of the slot-defining members is also approximately 12 cm (but does not exceed 12 cm so that the slot defining members do not restrict the pivoting of the arms of the top portion of a jewel case mounted between the slot-defining members). The distance between the slot-defining members is approximately 10 mm at the front surface 23 of the strip, and the slot-defining members converge slightly such that the distance between the slot-defining members is approximately 8.5 mm such that the slot-defining members converge toward each other slightly. Insertion of the hinge portion of a jewel case between the pair of slot-defining members deflects the slot-defining members outwardly slightly so that the hinge portion is pinched or wedged between the slot-defining members and hold the jewel case between the slot-defining members. The distance between adjacent pairs of slot-defining members is preferably approximately 2 cm to permit sufficient room between mounted jewel cases to permit pivoting of the top portions of the jewel case between adjacent mounted jewel cases.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A compact disc storage system for removably holding a plurality of compact disc jewel cases each compact disc jewel case including a bottom portion with an inboard edge, an outboard edge, and a pair of side edges extending therebetween, the inboard edge of the bottom portion having a width of approximately 1 cm, the compact disc jewel case having a hinge portion adjacent the inboard edge, the hinge portion having a width extending inwardly from the inboard edge approximately 1.2 cm, the hinge portion having a length of approximately 12 cm, and each compact disc jewel case including a top portion with a square configuration defined by an inboard edge, an outboard edge, and a pair of side edges extending therebetween, the top portion having a pair of arms extending from the inboard edge, the arms being in a substantially parallel relationship to form a gap therebetween, the arms being and in a substantially coplanar relationship with the side edges, the side edges of the bottom portion adjacent the inboard edge of the bottom portion being positioned between the arms, each of the arms being rotatably mounted on one side edge of the side edges of the bottom portion adjacent the inboard edge thereof, the system comprising:

a multiple compact disc jewel case storage unit including an elongated strip, the elongated strip having a pair of relatively longer side edges and a pair of relatively shorter end edges, a front face of the strip having a plurality of slots adapted for receiving an inboard edge of the bottom portion of a compact disc jewel case, each slot being defined by a pair of slot-defining members integrally coupled to the front face of the strip in a spaced parallel relationship, each of the slot-defining members having a length extending between the long linear parallel side edges, each of the slot-defining members having a width extending from the front face of the strip to a free edge of the slot-defining member;

wherein each pair of slot-defining members is adapted to grip an edge portion of the compact disc jewel case while permitting the top portion of the jewel case gripped thereby to pivot with respect to the bottom portion of the jewel case; and wherein the width of each of the slot-defining members is less than the width of the hinge portion of the compact disc jewel case and the length of each of the slot-defining members is less than the length of the hinge portion of the compact disc jewel case for allowing the arms of the top portion of each compact disc jewel case to pivot upwardly with respect to the bottom portion of the jewel case to allow access to a compact disc stored in the compact disc jewel case while the hinge portion of the compact disc jewel case is received in the slot between one of the pair of slot-defining members.

2. A compact disc storage system as set forth in claim 1 wherein the strip is constructed from a resiliently flexible material.

3. A compact disc storage system as set forth in claim 1 wherein each of the slots is adapted such that an inboard edge of the bottom portion of each of the compact disc housings may be removably lodged in the corresponding slot with the compact disc jewel case being held in a substantially perpendicular relationship with the strip of the storage unit.

4. A compact disc storage system as set forth in claim 3 wherein adjacent pairs of slot-defining members are spaced from each other in a manner permitting pivoting of the top portion of each compact disc jewel case with respect to the bottom portion of the compact disc jewel case while compact disc jewel cases are lodged in the slots of the adjacent pairs of slot-defining members.

5. A compact disc storage system as set forth in claim 4 wherein a spacing between adjacent pairs of slot-defining members is approximately twice a spacing between slot-defining members of one of the pairs of slot-defining members.

6. A compact disc storage system for holding a plurality of standard compact disc jewel cases, each compact disc jewel case including a bottom portion with an inboard edge, an outboard edge, and a pair of side edges extending therebetween, the inboard edge of the bottom portion having a width of approximately 1 cm, the compact disc jewel case having a hinge portion adjacent the inboard edge, the hinge portion having a width extending inwardly from the inboard edge approximately 1.2 cm, the hinge portion having a length of approximately 12 cm, and each compact disc jewel case including a top portion with a square configuration defined by an inboard edge, an outboard edge, and a pair of side edges extending therebetween, the top portion having a pair of arms extending from the inboard edge, the arms being in a substantially parallel relationship to form a gap therebetween, the arms being and in a substantially coplanar relationship with the side edges, the side edges of the bottom portion adjacent the inboard edge of the bottom portion being positioned between the arms, each of the arms being rotatably mounted on one side edge of the side edges of the bottom portion adjacent the inboard edge thereof, the storage system comprising:

a compact disc jewel case storage unit including an elongated strip having a rectangular configuration with a front surface, a rear surface, and a periphery formed therebetween, the periphery defined by a pair of long linear parallel side edges and a pair of short linear parallel end edges having a triangular cross-section, the front face having a plurality of pairs of slot-defining members, the slot-defining members being integrally coupled to the front face of the strip, each pair of slot-defining members extending from the strip for defining a slot therebetween for receiving the inboard edge of the bottom portion of the compact disc jewel case, each of the slot-defining members having a length extending between the long linear parallel side edges, each of the slot-defining members having a width extending from the front face of the strip to a free edge of the slot-defining member;

wherein inner faces of the slot-defining members of each pair converge toward each other at free ends of the pair of slot-defining members such that the inboard edge of each of the compact disc housings may be removably lodged in the corresponding slot such that the compact disc jewel case is held in a substantially perpendicular relationship with respect to the strip of the storage unit; and wherein the width of each of the slot-defining members is less than the width of the hinge portion of the compact disc jewel case and the length of each of the slot-defining members is less than the length of the hinge portion of the compact disc jewel case for allowing the arms of the top portion of each compact disc jewel case to pivot upwardly with respect to the bottom portion of the jewel case to allow access to a compact disc stored in the compact disc jewel case while the hinge portion of the compact disc jewel case is received in the slot between one of the pair of slot-defining members.

7. The system of claim 6 wherein the storage unit is constructed from a flexible inelastic material.

8. A compact disc storage system comprising, in combination:

a plurality of standard compact disc jewel cases, each compact disc jewel case including a bottom portion with a rectangular configuration defined by an inboard edge, an outboard edge, and a pair of side edges. extending therebetween, the inboard edge of the bottom portion having a width of approximately 1 cm, the compact disc jewel case having a hinge portion adjacent the inboard edge, the hinge portion having a width extending inwardly from the inboard edge approximately 1.2 cm, the hinge portion having a length of approximately 12 cm, and each compact disc jewel case including a top portion with a rectangular configuration defined by an inboard edge, an outboard edge, and a pair of side edges extending therebetween, the top portion having a pair of arms extending from the inboard edge, the arms being in a substantially parallel relationship to form a gap therebetween, the arms being and in a substantially coplanar relationship with the side edges, the side edges of the bottom portion adjacent the inboard edge of the bottom portion being positioned between the arms, each of the arms being rotatably mounted on one side edge of the side edges of the bottom portion adjacent the inboard edge thereof;

a multiple compact disc jewel case storage unit, including an elongated strip having a rectangular configuration with a front surface, a rear surface, and a periphery formed therebetween, the periphery defined by a pair of long linear parallel side edges and a pair of short linear parallel end edges having a triangular cross-section, the front face having a plurality of pairs of thin planar rectangular slot-defining members, each pair of slot-defining members defining a slot therebetween for receiving the inboard edge of the bottom portion of the compact disc jewel case, the slot-defining members being integrally coupled to the front face of the strip, each of the slot-defining members having a length extending between the long linear parallel side edges, each of the slot-defining members having a width extending from the front face of the strip to a free edge of the slot-defining member, the storage unit being constructed from a flexible inelastic material;

wherein inner faces of the slot-defining members of each pair converge toward each other at free ends of the pair of slot-defining members, a width of the slots between adjacent slot-defining members is slightly less than the width of the inboard edge of the bottom portion of the compact disc jewel case such that the inboard edge of each of the compact disc housings may be removably lodged in the corresponding slot such that the compact disc jewel case is held in a substantially perpendicular relationship with respect to the strip of the storage unit;

wherein the width of each of the slot-defining members is less than the width of the hinge portion of the compact disc jewel case and the length of each of the slot-defining members is less than the length of the hinge portion of the compact disc jewel case for allowing the arms of the top portion of each compact disc jewel case to pivot upwardly with respect to the bottom portion of the jewel case to allow access to a compact disc stored in the compact disc jewel case while the hinge portion of the compact disc jewel case is received in the slot between one of the pair of slot-defining members.

* * * * *